United States Patent [19]
Wu et al.

[11] Patent Number: 5,460,447
[45] Date of Patent: Oct. 24, 1995

[54] ROTATING STIRRING DEVICE

[75] Inventors: Hua Wu, Bollate; Vincenzo Arcella, Novara, both of Italy

[73] Assignee: Ausimont S.p.A., Italy

[21] Appl. No.: 195,529

[22] Filed: Feb. 14, 1994

[30] Foreign Application Priority Data

Feb. 17, 1993 [IT] Italy .................. MI93A0289

[51] Int. Cl.$^6$ .................................................. B01F 7/18
[52] U.S. Cl. .................................................. 366/279; 366/302
[58] Field of Search .................... 366/241, 242, 366/244, 245, 247, 249, 250–253, 279, 309, 310, 312, 343, 302; 422/131, 135, 225

[56] References Cited

U.S. PATENT DOCUMENTS

| | | | |
|---|---|---|---|
| 359,645 | 3/1887 | Sullivan | 366/245 |
| 2,610,432 | 9/1952 | Ambrose | 366/241 |
| 3,342,460 | 9/1967 | Bolde . | |
| 3,980,281 | 9/1976 | Okabayashi | 366/279 |
| 4,125,065 | 11/1978 | Lee | 366/244 |
| 4,151,792 | 5/1979 | Nearhood | 366/251 |
| 4,264,215 | 4/1981 | Nunlist | 366/279 |

FOREIGN PATENT DOCUMENTS

| | | | |
|---|---|---|---|
| 1247722 | 2/1961 | France . | |
| 13699 | 12/1956 | Germany | 366/312 |
| 63270532 | 2/1989 | Japan . | |

OTHER PUBLICATIONS

"Advances in Chemical Engineering" *Academic Press, Inc.*, vol. 17 (1992), pp. 4–9.

"Advances in Chemical Engineering", vol. 17, pp. 5–8, Academic Press (1992).

Y. Imai, H. Takei and M. Matsumura "Biotechnology an Bioengineering", vol. XXIX, pp. 982–993 (1987).

*Primary Examiner*—David A. Scherbel
*Assistant Examiner*—Terrence R. Till
*Attorney, Agent, or Firm*—David M. Klein; Bryan Cave

[57] ABSTRACT

A rotating stirring device, particularly for mixing heterogeneous systems in mechanical stirred reactors, is fit to be joined to a drive shaft coaxial with respect to the device rotation axis. The device includes a plurality of extended and substantially C-shaped stirring elements symmetrically arranged with respect to the rotation axis and joined to each other at respective ends corresponding with the rotation axis. Such a device permits a very efficient material exchange among different phases to be obtained and to remain substantially constant with an increase in the volume of the mass being stirred. The device is also characterized by a high mixing homogeneity and particularly low shear stress values.

7 Claims, 4 Drawing Sheets

PRIOR ART

5,460,447

ROTATING STIRRING DEVICE

BACKGROUND OF THE INVENTION

1. Field of the Invention

The present invention relates to a rotating stirring device particularly for mixing heterogeneous systems in mechanical stirred reactors.

2. Description of the Related Art

Various types of mechanical stirred reactors are known in the art, generally of cylindric shape, in which processes are carried out where a continuous and uniform mixing of various components and an efficient mass exchange between different phases (for instance, gas-liquid, gas-liquid-solid, liquid-solid, liquid-liquid, etc.) are required. The mechanical stirring is commonly carried out through a stirrer put inside the reactor in an axial position. The particular stirrer shape (turbine, blade, propeller, etc.) is mainly chosen according to the viscosity of the mass to be stirred (see "Advances in Chemical Engineering", vol. 17, pag. 5–8, Academic Press, 1992).

A common shortcoming of prior art stirring devices is in the case of gas-liquid systems, a generally low mass transfer coefficient between the phases which considerably decreases when the volume of the mass put under stirring is increased with time. This occurs, for instance, in polymerization reactions in emulsion or in suspension in which at least one of the monomers is present in the gas phase. During the polymerization a gradual increase in the volume and the solid content of the liquid phase occurs. A lowering of the mass transfer between the gas phase and liquid phase and consequently a reduction of the process yield, results therefrom.

The difficulty in obtaining satisfactory mass exchanges between the various phases imposes limits in the reactor shape. In particular, with the traditional stirring systems the use of reactors with a large height/diameter ratio, which would yield a more efficient thermal exchange, is impossible.

In gas-liquid systems, in order to improve the mass exchange between the phases, devices which distribute the gas inside the liquid phase (spargers) are used, they are in practice, toroidal shaped devices, with holes through which the gas is bubbled. Such devices require very frequent maintenance, since they tend to be easily clogged, especially when in the liquid phase a solid phase is present or is formed during the reaction (for example, in polymerization reactions).

The Applicant has now invented a new type of rotating stirring device as described hereinunder, particularly suited for mixing heterogeneous systems, which permits a very efficient mass exchange between different phases to be obtained and which remains substantially constant when the volume of mass stirred increases. Moreover a high mixing homogeneity, with particularly low shear stress values, is achieved by the inventor.

SUMMARY OF THE INVENTION

It is therefore object of the present invention a rotating stirring device, particularly for mixing heterogeneous systems inside mechanical stirred reactors, fit to be joined to a drive shaft coaxial with respect to the device rotation axis, characterized in that it comprises a plurality of extended and substantially C-shaped stirring elements, said stirring elements being symmetrically arranged with respect to the rotation axis and being joined each other at the respective ends in correspondence with the rotation axis.

The characteristics of the invention will be now better illustrated by the following description and by the enclosed drawings relating to a non-limitative embodiment, in which the figures show:

BRIEF DESCRIPTION OFF THE DRAWINGS

DESCRIPTION OF THE PREFERRED EMBODIMENT

Figure 1:
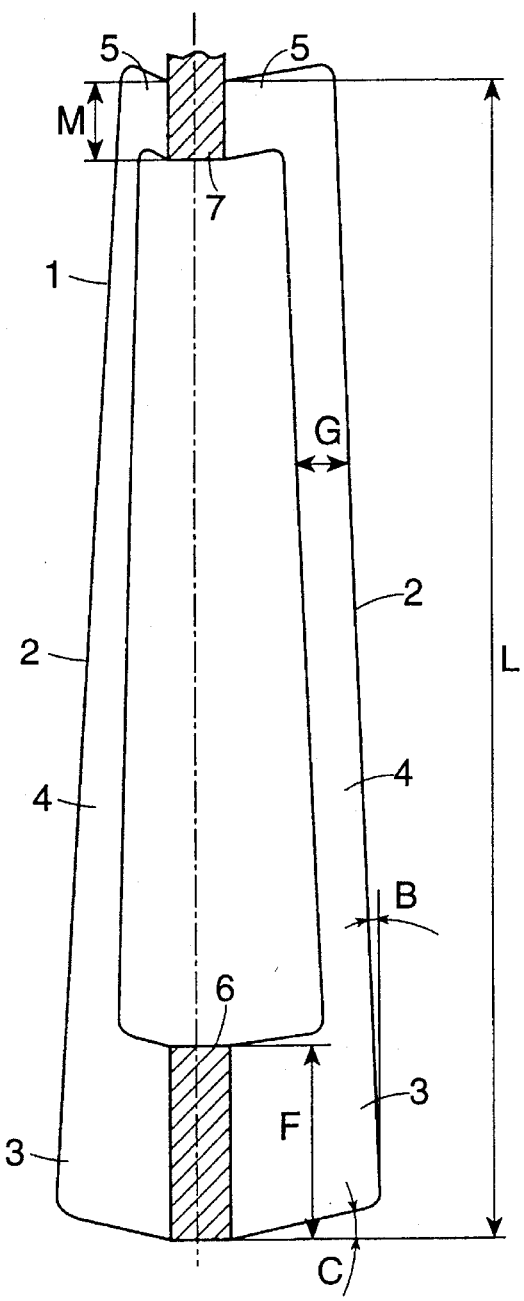
FIG. 1, is a longitudinal section new along the plan 1—1.
Figure 2:
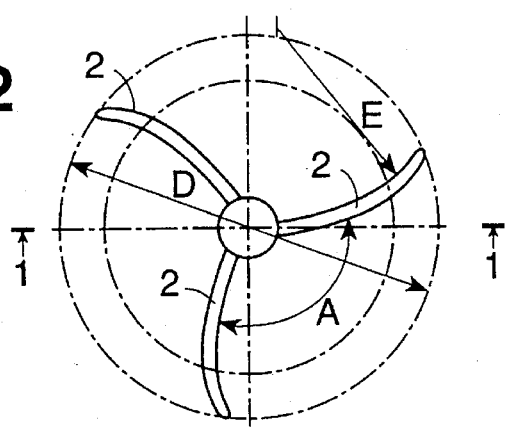
FIG. 2, is a top view of the present invention.

The stirring device (1) shown in FIGS. 1–2 comprises three stirring elements (2), which, according to a preferred embodiment of the present invention, are concave blade-shaped with concavity toward the rotation direction of the device itself. The stirring elements (2) are symmetrically arranged with respect to the rotation axis, each forming with respect to the other an angle (A) of 120°. Each stirring element (2) consists of a lower end part (3), a vertical part (4) and an upper end part (5). As shown in FIG. 1, the stirring device (1) preferably tapers toward the upper part, wherefore the lower end part (3) is longer than the upper end part (5), so that the vertical part (4) defines with the rotation axis an angle (B) comprised between 0° to 10°. Such tapering has the function of obtaining a more homogeneous distribution of the axial displacement inside the reactor.

The three stirring elements (2) are joined to each other through the lower (6) and upper (7) connection elements, on which the lower end (3) and upper end (5) parts are connected respectively. The upper connection element (7) is solidly joined to a drive axis, which rotates the stirring device (1).

The lower edge of the lower end part (3) forms with the horizontal plane an angle (C) comprised between 0° and 45°, according to the particular shape of the reactor bottom, which is usually concave.

The size characteristics of the stirring device of the present invention, essentially depend upon the reactor sizes in which the device is employed.

Considering a substantially cylinder-shaped reactor having a diameter (T) and a height (V), the sizes of the stirring device of the present invention are preferably the following:

base diameter (D) of the stirring device (1): from $\frac{1}{3}$ to $\frac{2}{3}$ of the diameter (T);

bending radius (E) of the stirring elements (2): greater than or equal to $\frac{1}{3}$ of the diameter (T);

height (F) of the lower end part (3): greater than or equal to $\frac{1}{5}$ of the diameter (D);

Width (G) of the vertical part (4): from $\frac{1}{20}$ to $\frac{1}{4}$ of the diameter (T);

height (L) of the stirring elements (2): from $\frac{3}{2}$ of the diameter (D) to a value about equal to the height (V):

Of course the maximum value of the height (L) depends upon the particular shape of the reactor and must be such so as to allow free rotation of the device inside the reactor.

Regarding the height (M) of the upper end part (5), this is generally uninfluential on the stirring effectiveness, since it usually remains outside the mass being stirred. However, the height (M) is generally at least equal to 1/20 of the diameter (T).

The values given above are merely indicative and can be modified according to the characteristics of the particular heterogeneous system considered, such as, viscosity, density, solid contents, number of phases, etc.

It is also evident that as to the embodiment previously illustrated, various changes, adjustments, variants and replacements of elements with other functionally equivalent elements can be carried out, while remaining within the scope of the claims reported hereinafter.

Because of the high mass exchange between the different phases and because of the low shear stress, the present invention is particularly advantageous for reactors to be used in:

(co)polymerization reactions in emulsion, in particular of fluorinated olefinic monomers, for the production of (co) polymers, such as, for example: homopolymers of tetrafluoroethylene and its elastomeric or plastomeric copolymers with hexafluoropropene, fluorovinylethers, such as perfluoropropylvinylether or perfluoromethylvinylether; homopolymers of vinylidene fluoride and its elastomeric or plastomeric copolymers with hexafluoropropene, tetrafluoroethylene, fluorovinylethers, fully hydrogenated olefins, brominated and/or iodinated vinyl comonomers, etc.;

(co)polymerization reactions in suspension, in particular of fluorinated olefinic monomers, for the production of (co)polymers such as, for instance, ethylene/tetrafluoroethylene (ETFE) or ethylene/chlorotrifluoroethylene (CTFE) copolymers;

fermentation reactions for the production of active principles for pharmaceutical use, in particular those reactions in which shear stress sensitive microorganisms and/or products are present;

processes for slurry preparation, in particular those processes in which shear stress sensitive products are employed (for instance preparation of zeolite dispersions).

As previously pointed out, the stirring device of the present invention assures a reaction rate quite constant over time, with homogeneous mixing and low shear stress. In particular, in the case of polymerization reactions in emulsion, a low shear stress is extremely advantageous, as it allows stable polymerization latexes to be obtained and it avoids the undesired formation of polymer coagula. Such coagula, as well known, besides fouling the reactor with subsequent maintenance problems, cause various inconveniences, such as reduction of the thermal exchange coefficient, contamination of the polymer, lowering of the reaction rate, etc.

In the case of polymerizations in suspension, the stirring device of the present invention permits homogeneous mixing to be obtained even for contents of suspended solid greater than 50% by weight.

The effectiveness of the present invention in mixing of heterogeneous systems is evident from the data reported hereinbelow, which compares the stirring device of the present invention (FIG. 3) with a device of the prior art (FIG. 4), in which the stirring is obtained through two Rushton turbines placed on the same rotation axis.

Figure 3:
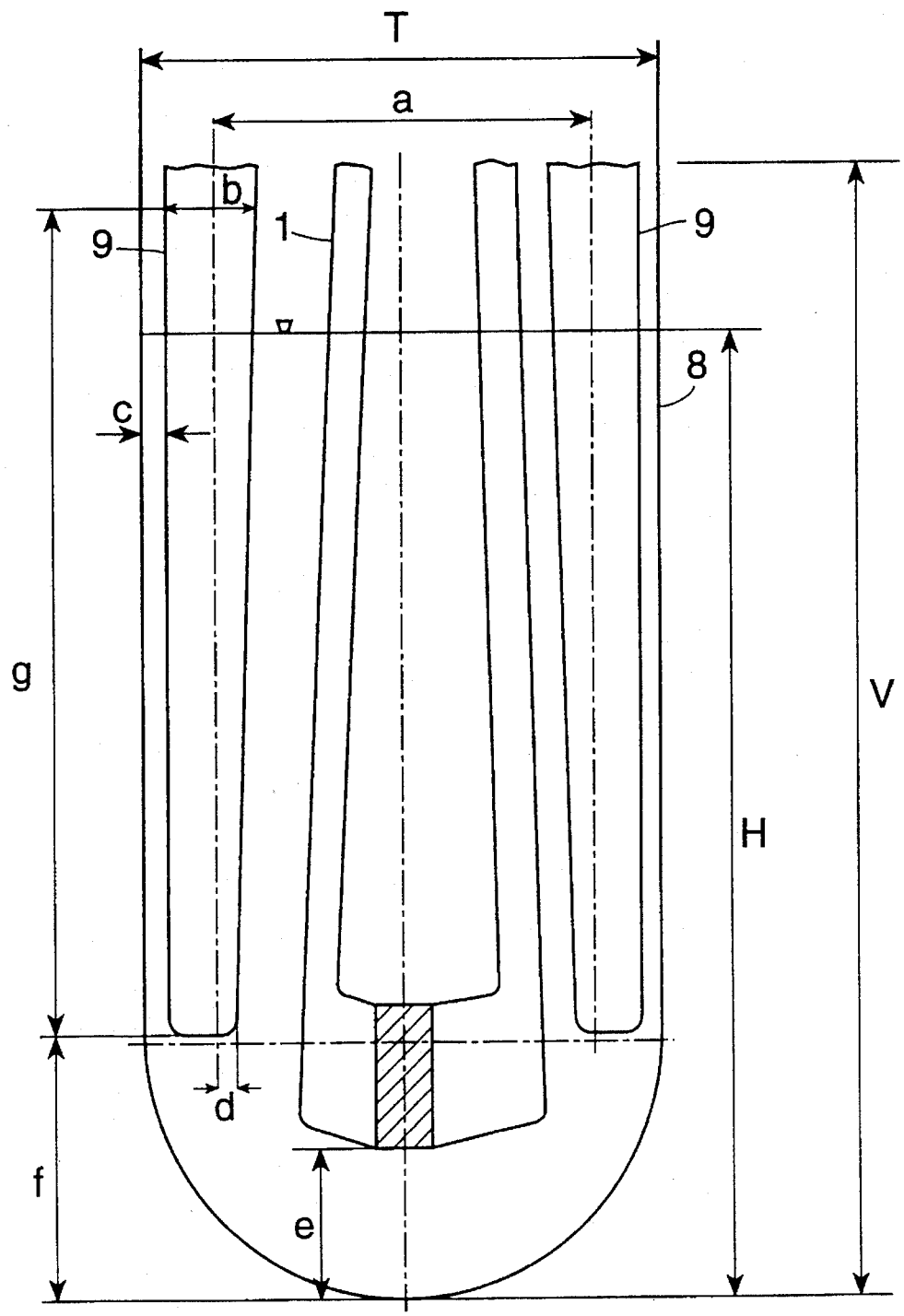
FIG. 3 shows a section view of the invention in a reactor.

FIG. 3 shows a section of the stirring device object of the present invention placed into a reactor (8) provided with a baffles couple (9) symmetrically placed inside the reactor (8). The level of the liquid being stirred is indicated by H.

The real sizes of the various elements of the system reactor+stirrer employed in the measurements are as follows:

Reactor (notation of FIG. 3): T=202 mm; a=150 mm; b=36 mm; c=7 mm; d=6 mm; e=60 mm; f=110 mm; g=324 mm;

wherein g is the baffle height corresponding to a baffle width b, d is the half-width at the baffle base and identifies the inclination of the baffle, and c and f are the distances of the baffle from the reactor lateral wall and from the reactor bottom respectively.

Stirrer (notation of FIGS. 1 and 2): A=120°; B=2.42°; C=10°; D=112 mm; E=60 mm; F=54 mm; G=14 mm; L=420 mm; M=20 mm.

Figure 4:
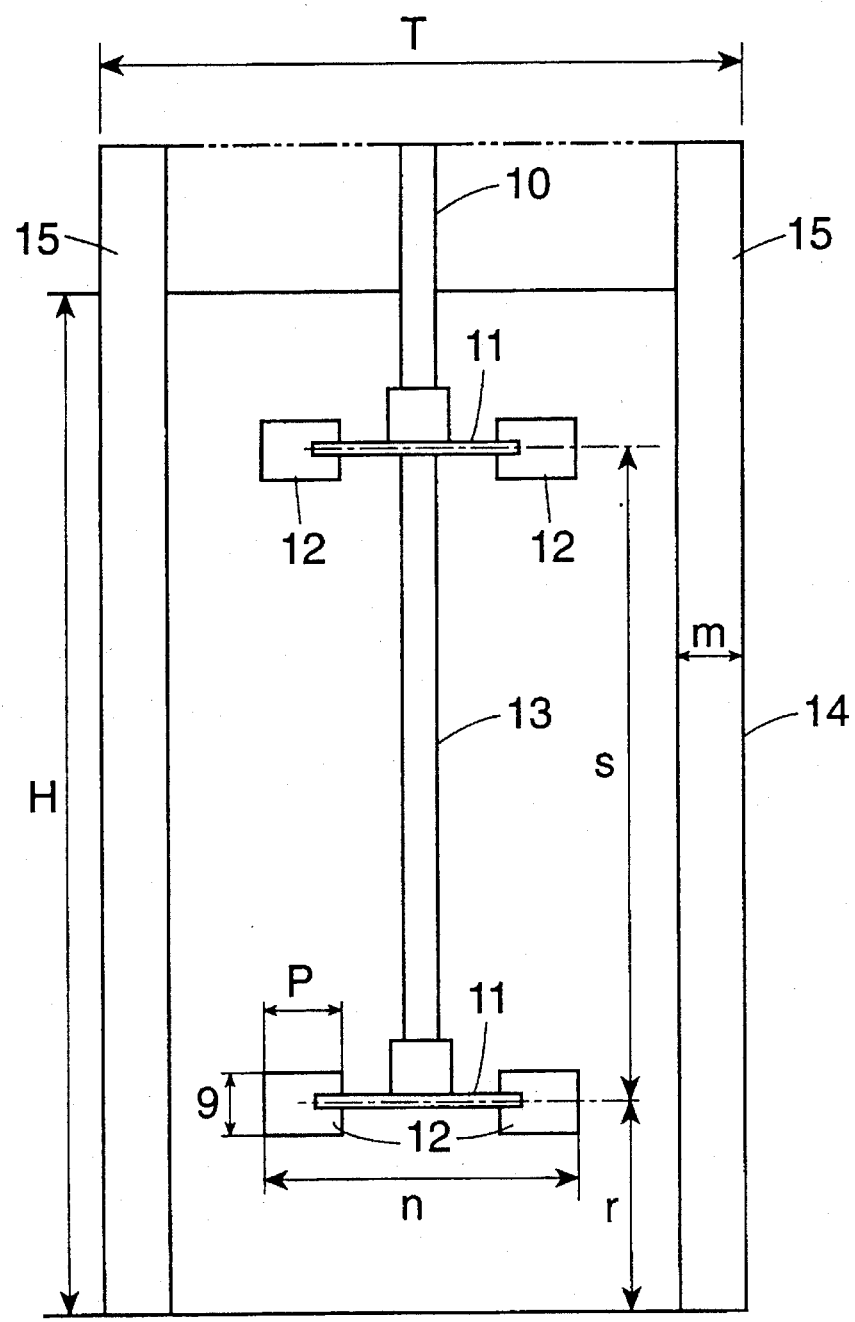
FIG. 4 shows a section view of a prior art stirrer.

FIG. 4 shows a section view of the device of the prior art (10), consisting of a couple of six blade (12) Rushton turbines (11) set on a rotation shaft (13) placed into a reactor (14) provided with four baffles (15) symmetrically placed inside the reactor (14). The level of the liquid being stirred is indicated by H. The real sizes of the various elements of the system reactor+stirrer employed in the measurements are the following:

T=202 mm; m=20.2 mm; n=100 mm; p=25 mm; q=20 mm; r=67.3 mm; s=200 mm.

For each system stirrer + reactor the mass transfer coefficient ($k_1$) of the oxygen between the liquid phase (water) and gas phase (air) was measured, according to the method described by Y. Imai, H. Takei and M. Matsumura in "Biotechnology and Bioengineering", Vol. XXIX, p. 982–993 (1987). The measurements were carried out with the reactor at different filling levels.

Figure 5:
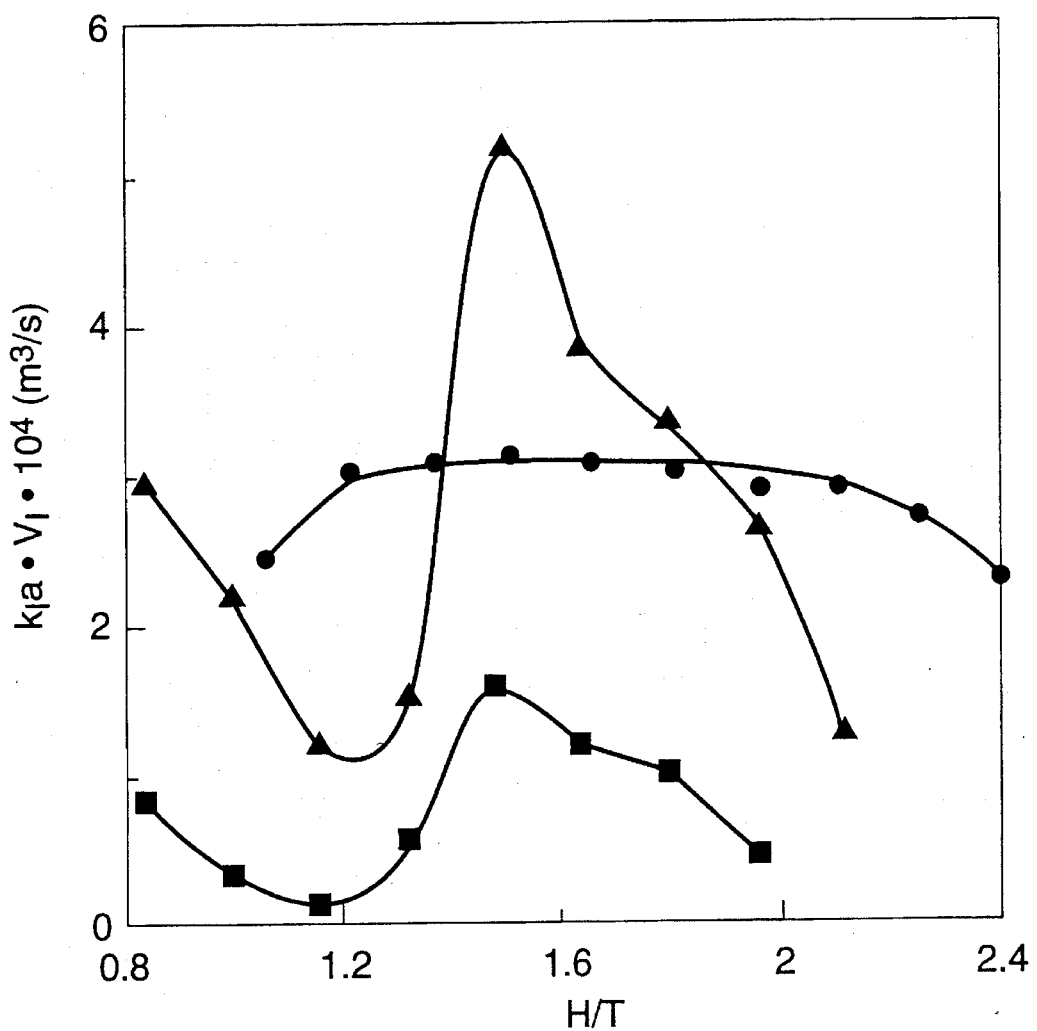
FIG. 5 shows a comparison of the present stirrer to the prior art.

The results are reported in FIG. 5. In abscissa the ratio H/T is reported, that is, the ratio between liquid height (H) and reactor diameter (T), in ordinates the product $k_1 a \cdot V_1 \cdot 10^1$, where $k_1$ is the mass transfer coefficient (expressed in m/sec), a is the gas-liquid interface specific area (expressed in $m^{-1}$) and $V_1$ is the liquid volume in the reactor (expressed in $m^3$).

The three curves reported in FIG. 5 refer to:

system reactor+stirring device object of the present invention (FIG. 3), with rotation rate N=5.8 $sec^{-1}$ and specific power W=2.0–2.6 Kw/$m^3$ (symbol ●);

system reactor+stirring device of the prior art (FIG. 4), with rotation rate N=10 $sec^{-1}$ and specific power W=6.5–10 Kw/$m^3$ (symbol ▲);

system reactor+stirring device of the prior art (FIG. 4), with a rotation rate N=6.5 $sec^{-1}$ and specific power W=1.8–2.8 Kw/$m^3$ (symbol ■).

The specific power, which is a quantity correlated to the shear stress, varies with the filling level of the reactor.

From the comparison of the graphs reported in FIG. 5, it is clear that with the stirring device of the present invention it is possible to obtain a substantially constant mass exchange between gas phase and liquid phase when the reactor filling level varies, while with the device of the prior art very large fluctuations are observed. It is also important to note how with, the specific power being equal, the device of the present invention assures a much higher mass exchange between the phases.

We claim:

1. A mixing device which comprises:

a generally cylindrical reactor having a diameter and a height; and a stirring device having an axis of rotation, the stirring device located within the reactor and adapted to be rotated about the axis of rotation by a drive means, the stirring device comprising a plurality of C-shaped stirring elements symmetrically arranged about the rotation axis, each stirring element comprising a lower end part, a vertical part, and an upper end part, the stirring elements being attached together at the upper and lower end parts, each stirring element having a concave shape which has a bending radius with concavity in the direction of rotation of the stirring device, wherein the stirring device has a base diameter in the range of 1/3–2/3 the diameter of the reactor, the bending radius of the stirring elements is at least 1/3 the diameter of the reactor, the lower end part has a height at least 1/5 the base diameter of the stirring device, the vertical part has a width in the range of 1/20–1/4 of the diameter of the reactor, and each stirring element has a height in the range between 3/2 of the diameter of the stirring device and the height of the reactor.

2. The mixing device according to claim 1, comprising three stirring elements.

3. The mixing device according to claim 1, wherein the lower end part of each stirring element is longer than the upper end part, and the vertical part of each stirring element is at an angle of 0°–10° with the rotation axis.

4. The mixing device according to claim 1, wherein the lower end part of each stirring element has a lower edge at an angle of 0°–45° with the horizontal plane.

5. The mixing device according to claim 1, wherein the upper end part of each stirring element has a height at least 1/20 of the diameter of the reactor.

6. A (co)polymerization process of monomer(s), which comprises (co)polymerizing said monomer(s) in the reactor according to claim 1.

7. The (co)polymerization process of claim 6, wherein the monomer(s) are fluorinate olefinic monomer(s).

* * * * *